E. A. AND J. V. CUNNIFF AND J. K. LANNING.
WEFT REPLENISHING LOOM.
APPLICATION FILED DEC. 12, 1913.
1,341,883.
Patented June 1, 1920.
6 SHEETS—SHEET 1.
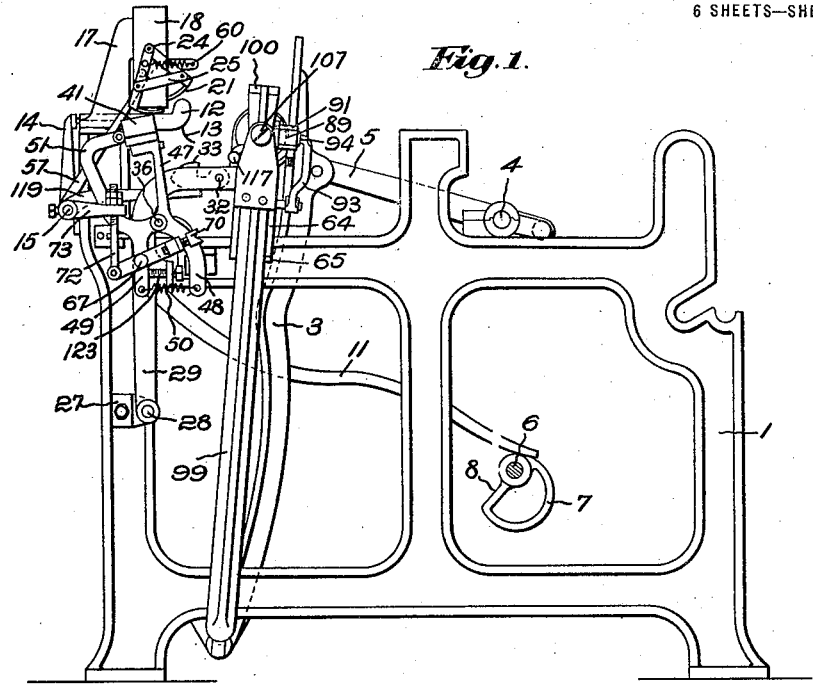
Witnesses:
Horace A. Crossman
Carl L. Choate
Inventors:
Edward A. Cunniff
John V. Cunniff
James K. Lanning
by Emery, Booth, James and Varney, Attys.

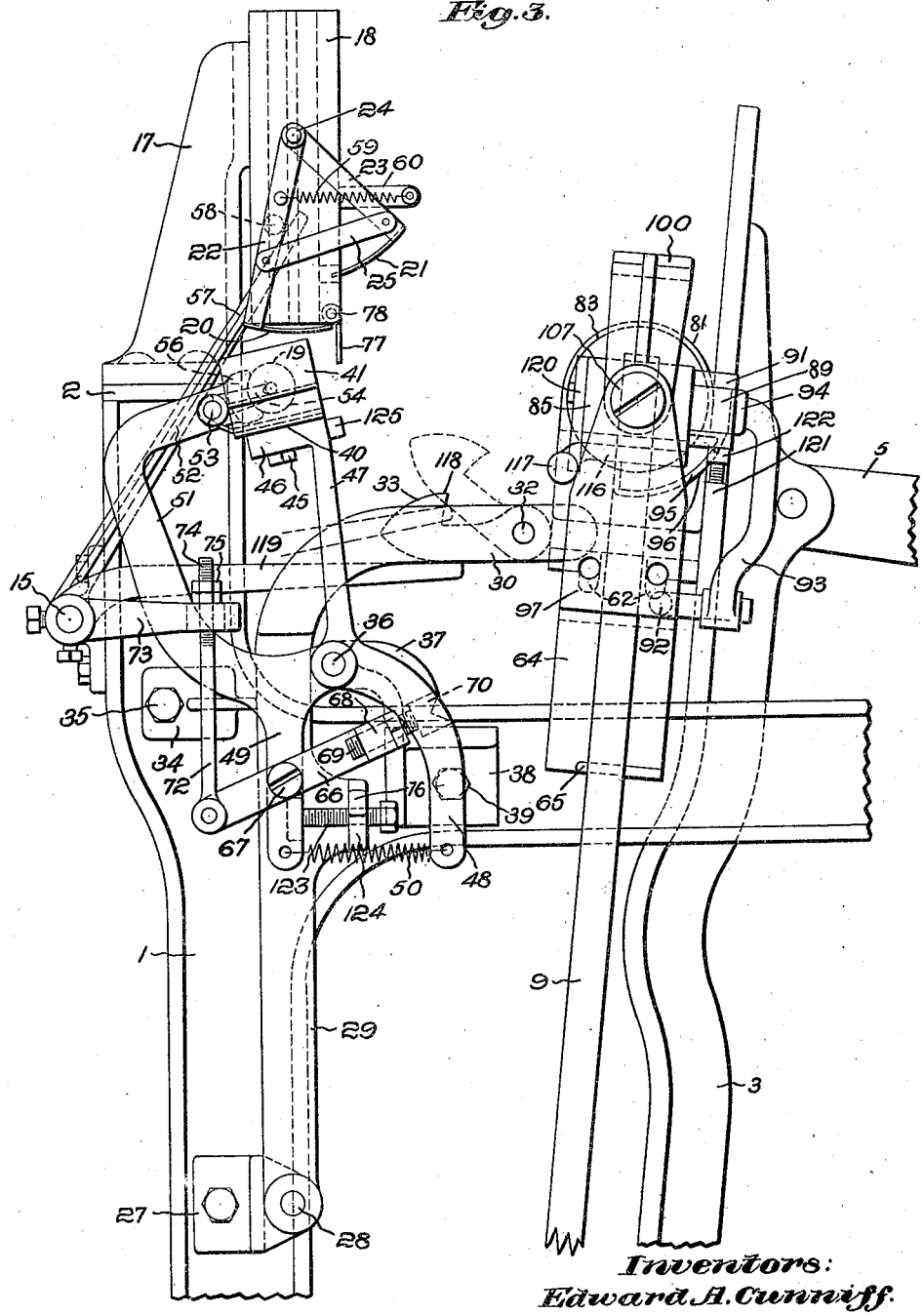

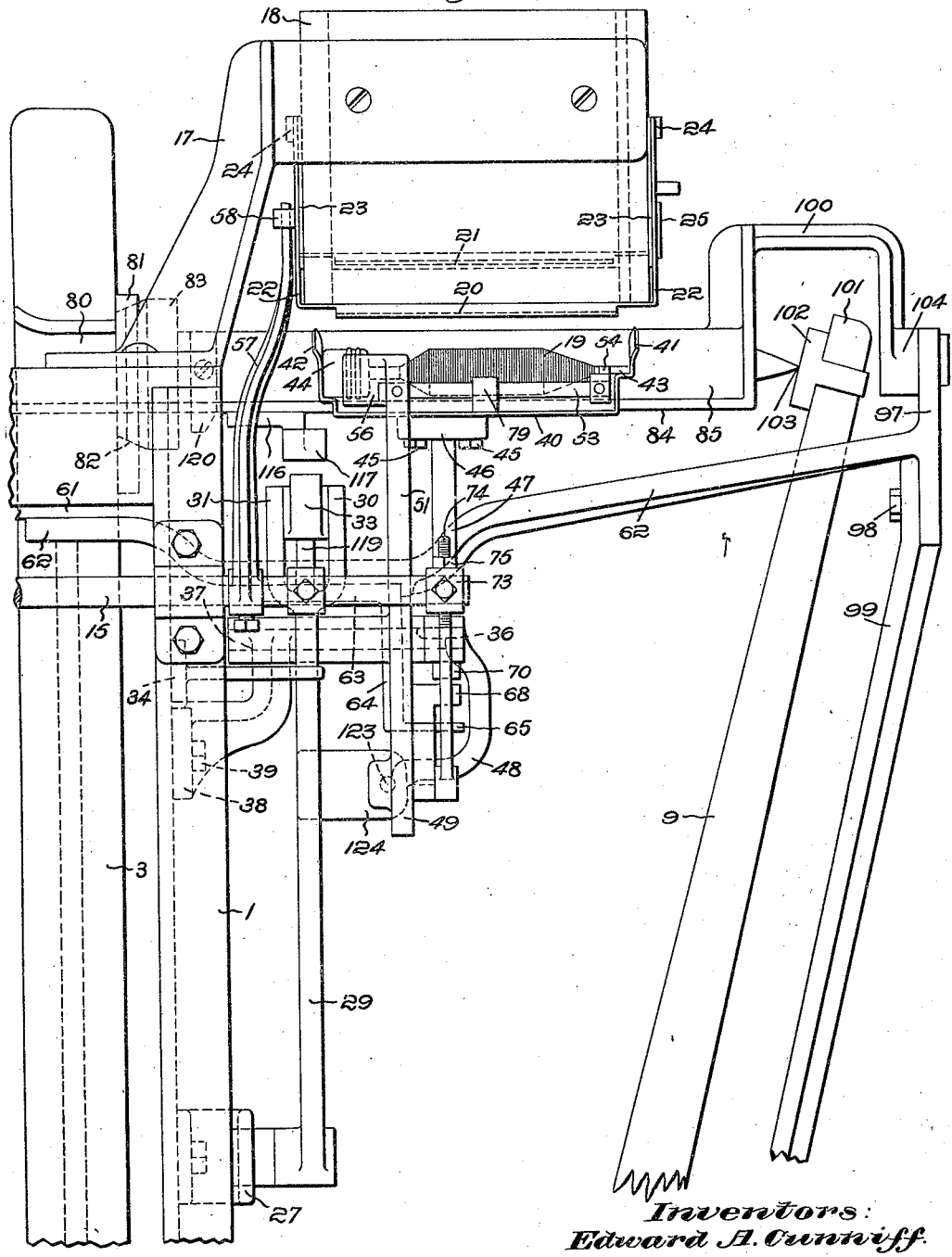

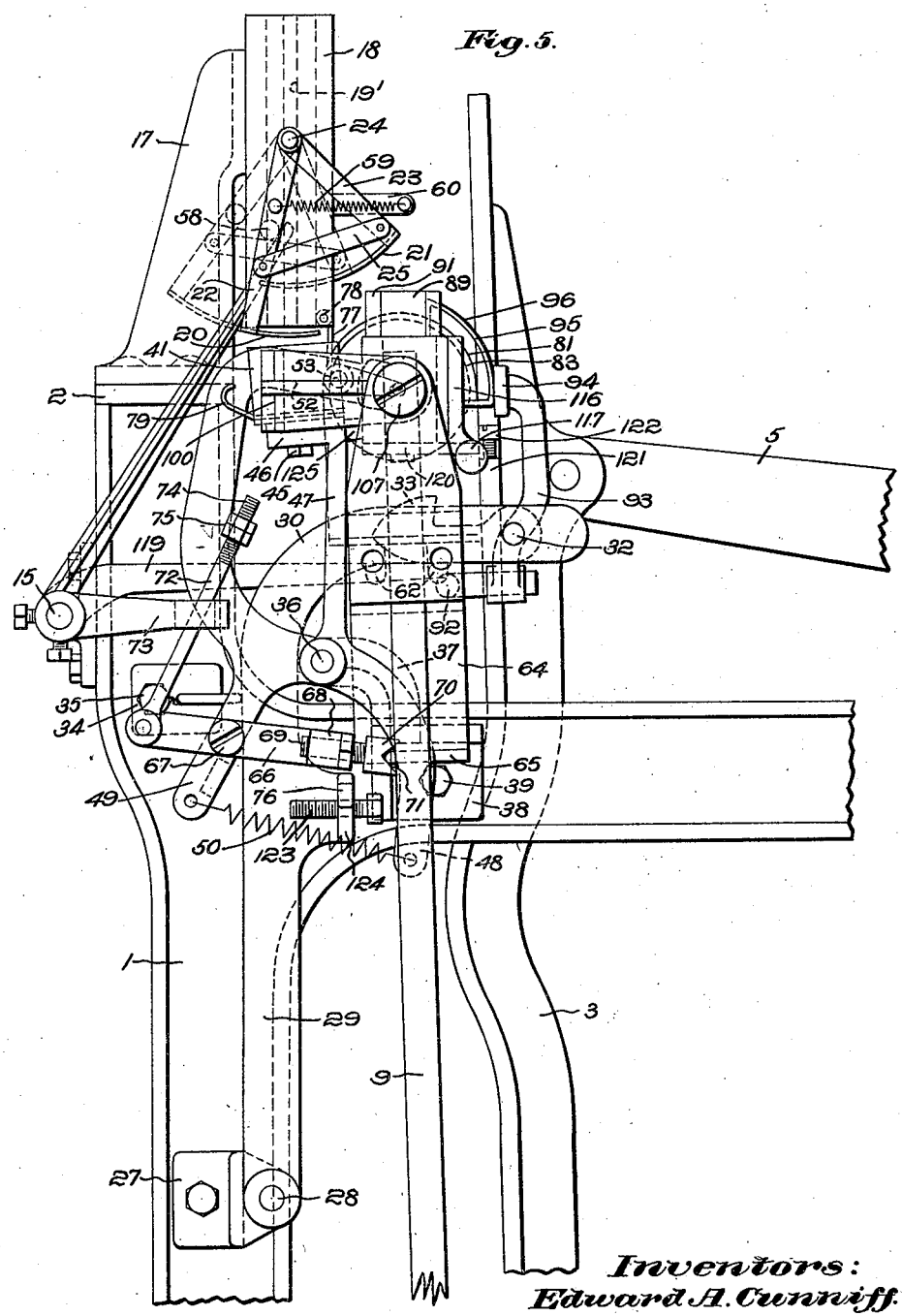

E. A. AND J. V. CUNNIFF AND J. K. LANNING.
WEFT REPLENISHING LOOM.
APPLICATION FILED DEC. 12, 1913.

1,341,883.

Patented June 1, 1920.
6 SHEETS—SHEET 5.

Witnesses:
Horace A. Crossman.
Carl L. Choate.

Inventors:
Edward A. Cunniff.
John V. Cunniff.
James K. Lanning.
by Emery, Booth, Janney & Varney Attys.

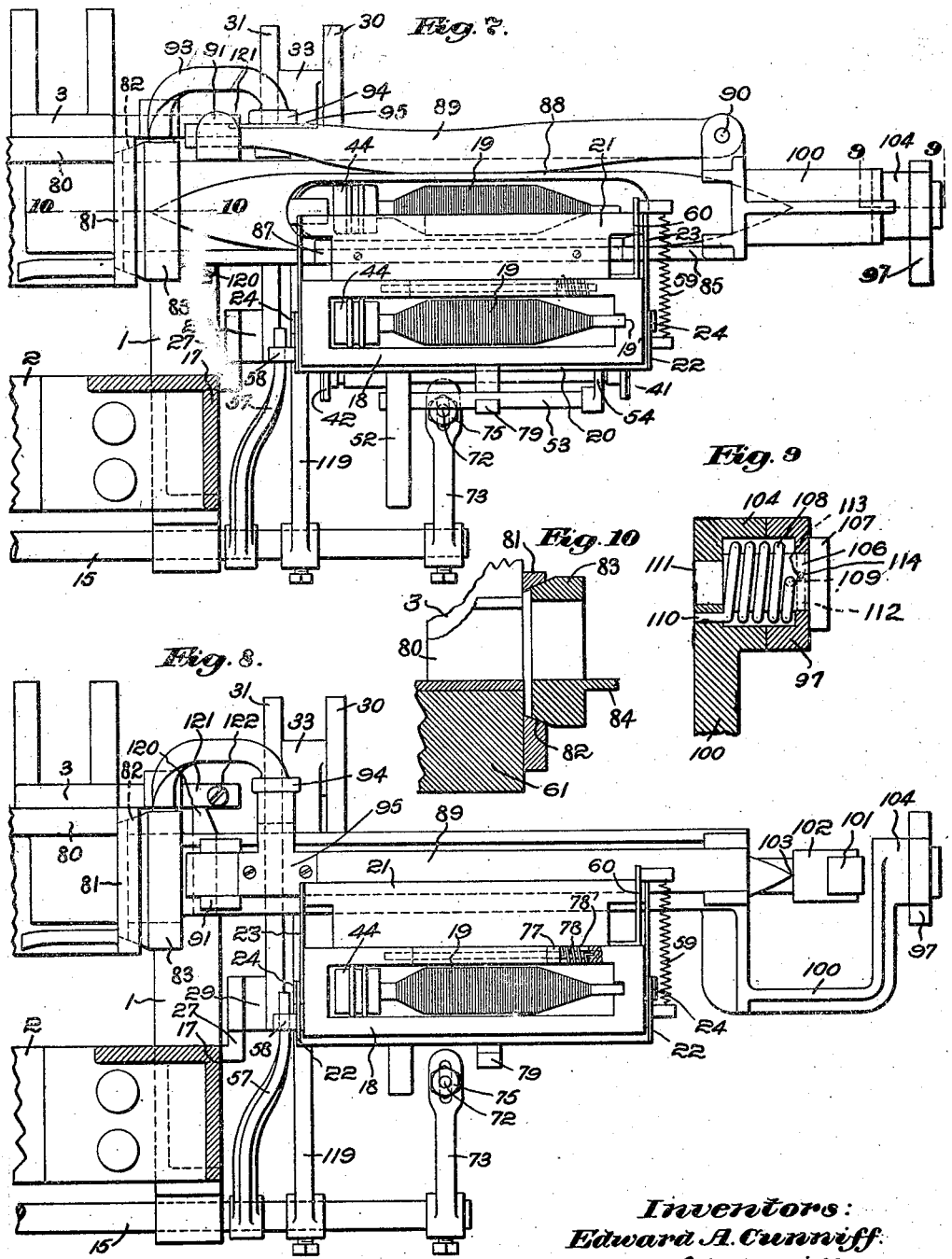

UNITED STATES PATENT OFFICE.

EDWARD A. CUNNIFF, OF NEW BEDFORD, JOHN V. CUNNIFF, OF FALL RIVER, AND JAMES K. LANNING, OF BOSTON, MASSACHUSETTS; SAID EDWARD A. CUNNIFF AND SAID JOHN V. CUNNIFF ASSIGNORS OF THEIR RIGHTS TO SAID JAMES K. LANNING.

WEFT-REPLENISHING LOOM.

1,341,883.      Specification of Letters Patent.      Patented June 1, 1920.

Application filed December 12, 1913. Serial No. 806,329.

*To all whom it may concern:*

Be it known that we, EDWARD A. CUNNIFF, JOHN V. CUNNIFF, and JAMES K. LANNING, citizens of the United States, and residents, respectively, of New Bedford and Fall River, in the county of Bristol, and Boston, in the county of Suffolk, all in the State of Massachusetts, have invented an Improvement in Weft-Replenishing Looms, of which the following description, in connection with the accompanying drawings, is a specification, like characters on the drawings representing like parts.

This invention relates to replenishing looms and particularly to looms wherein the weft carrier, holder or support is ejected from the running shuttle and another substituted therefor upon breakage or substantial exhaustion of the filling.

In order that the principle of the invention may be readily understood, a single embodiment thereof is disclosed in the accompanying drawings, wherein—

Figure 1 is a side elevation of a single box loom having the invention applied thereto;

Fig. 2 is a front elevation of the loom shown in Fig. 1, the middle portion thereof being broken away;

Fig. 3 is a side elevation upon an enlarged scale of a portion of the front of the loom shown in Fig. 1;

Fig. 4 is a front elevation of that portion of the loom shown in Fig. 3;

Fig. 5 is a view similar to Fig. 3, but representing the parts differently positioned;

Fig. 7 is a plan view of a portion of the structure shown in Fig. 5, the loom being in normal condition and the lay forward;

Fig. 8 is a view similar to Fig. 7, but showing the position of the parts during bobbin replenishment;

Fig. 9 is a sectional detail upon the line 9—9 of Fig. 7; and

Fig. 10 is a sectional detail upon the line 10—10 of Fig. 7.

Figure 6:
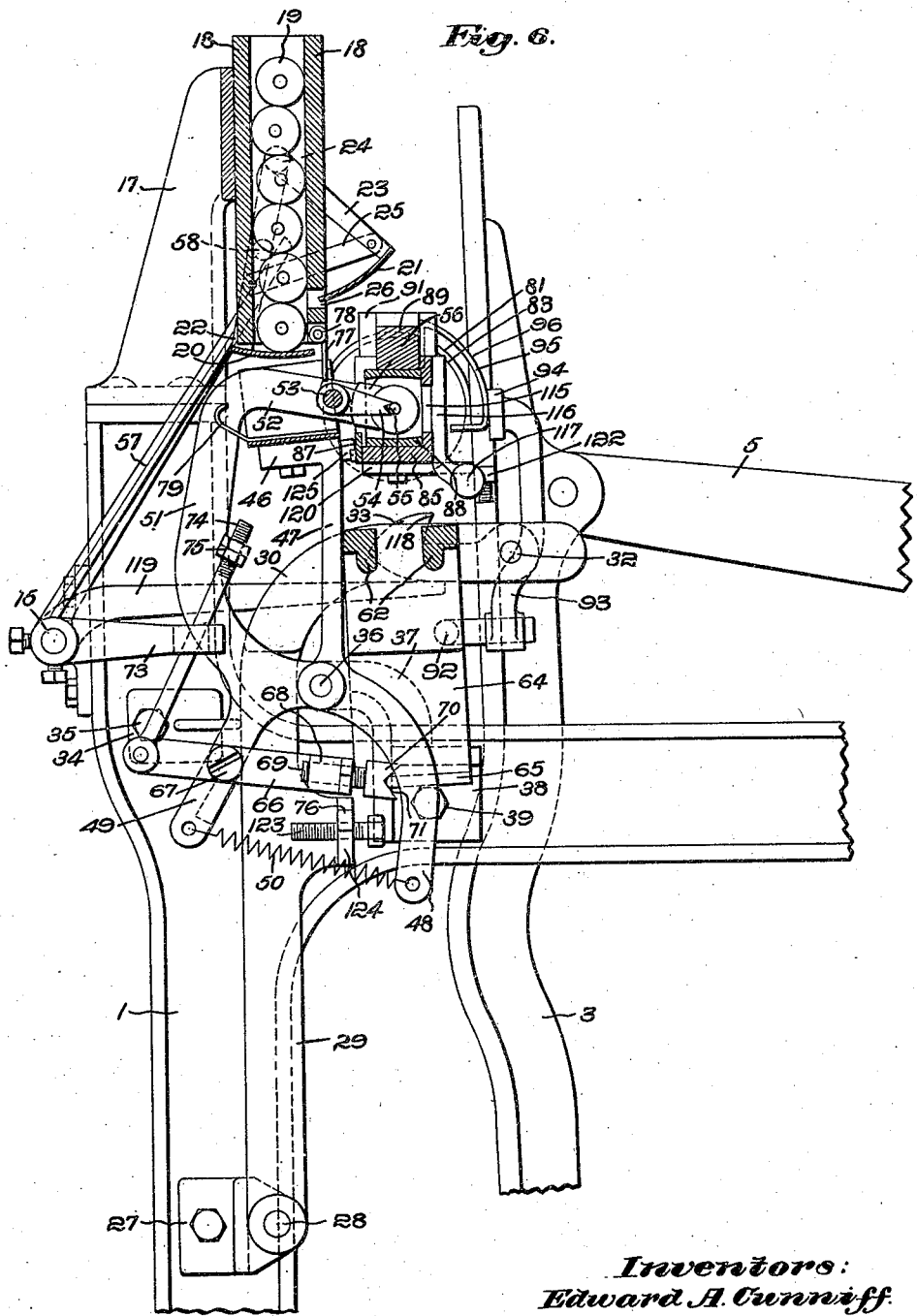
Fig. 6 is a view similar to Fig. 5 and representing the parts similarly positioned, but representing some of them in section.

The main purpose of the invention is to replenish the loom, preferably upon breakage of the filling, though within the scope of the invention, such transfer may be effected upon substantial exhaustion of the filling, that is, upon exhaustion to a predetermined extent. In the disclosed embodiment of the invention, the replenishment is effected by ejecting the exhausted filling carrier, holder or support (preferably a bobbin) from the running shuttle of the loom and substituting therefor a filled bobbin. So far as certain features of the invention are concerned, the replenishment may be effected by ejection of the running shuttle and the substitution of a spare or fresh shuttle therefor. While the invention is not limited to the type of loom herein shown, it is peculiarly serviceable for application to a loom having a single shuttle box at each side; in other words, it is peculiarly adapted to a plain loom operating with a single filler or weft, though in no wise restricted thereto.

Referring more particularly to the drawings and to that single type of the invention therein illustrated, the end frames of the loom are represented at 1—1, the breast beam at 2, the lay swords at 3, the crank shaft at 4 in Fig. 1, the sweeps or crank arms at 5, the cam shaft at 6, the weft or filling cam at 7, it being here provided with a cut out portion 8, the picker sticks at 9, and the picker stick brackets at 10.

These parts, excepting for the described formation of the weft or filling cam, may be and preferably are of the usual type or construction. Inasmuch as preferably the filling carrier is a bobbin and inasmuch as preferably weft replenishment is effected upon breakage or failure of the filling, we have herein disclosed and will describe that type of our invention involving the transfer of a filled bobbin to the shuttle upon indication of breakage or failure of the filling. The term "filling fault" and like terms are used in a generic sense to include breakage of the filling, and either exhaustion thereof, or exhaustion to a predetermined extent.

In Fig. 1 the weft hammer or weft cam follower is indicated at 11, it coöperating in the usual manner with the filling fork slide, the bracket whereof is indicated at 12, the weft fork being indicated at 13. Upon breakage or failure of the filling, the weft fork 13 fails to tilt and the weft or filling fork slide is pushed to the left viewing Fig. 1—that is, toward the front of the loom— and engages an upright lever 14 mounted upon a rock shaft 15 itself mounted in suitable bearings 16 upon the loom frame. The rocking of the shaft 15 effects the release or discharge of a filled bobbin from the magazine, preferably into a suitable receiver, and its transfer from the carrier into the running shuttle, and the consequent ejection of the exhausted bobbin from said shuttle. While within the scope of our invention the means for effecting these movements may widely be modified, the disclosed mechanism has been found effective for the purpose.

As shown most clearly in Figs. 3, 4 and 5, upon the upper face of the breast beam there is mounted a bracket 17, to which is secured the bobbin magazine 18. This is herein represented as having parallel front and rear walls 18 and as open at the top for the insertion of a series of bobbins 19. One of the end walls of the magazine is vertically recessed at 19′ for the reception of the points or heads of the bobbins. The bottom of the magazine is herein typified as a duplex gate or shelf, the two members of which are represented at 20 and 21. These are preferably slightly concaved in cross section and each is supported by depending lever arms 22, 23 from studs 24 upon the ends of the magazine. The two sets of lever arms 22, 23 are connected by links 25 so that as the gate or shelf 20 is swung to the left viewing Fig. 6 and releases the lowermost bobbin 19, the gate or shelf 21 is swung into place through an opening 26 in the magazine wall between the said lowermost bobbin and the one next above the same, which latter thus becomes the lowermost bobbin. Upon the return of the parts as hereinafter described to the position shown in Fig. 6, this lowermost bobbin is itself permitted to drop into the bobbin rest or receiver for transfer to the shuttle upon the next indication of weft failure.

As indicated in Figs. 3, 5 and 6, upon the side frame of the loom is bolted a bracket 27 having thereon a stud 28 upon which is fixedly received an upright bracket 29, the upper end whereof is forked as indicated most clearly at 30, 31 in Fig. 4, the said upper end being curved inwardly toward the lay and having pivoted therein upon a stud 32 a dog 33, the function of which will be hereinafter more fully set forth. The said bracket 29 is held in position in any suitable manner, but as herein represented its outer face is supported by a projection 34 upon the frame of the loom and which is here shown as a bracket, itself secured to the loom frame by a bolt 35. The opposite face of the said bracket 29 is supported by a stud 36 projecting from the curved upper extension 37 of a bracket 38 secured by bolt 39 to one of the side frames of the loom. Obviously, however, the bracket 29 may be held in position in any suitable manner, and if desired may be itself integral with the frame of the loom.

The bracket 29 constitutes a support for the rest or receiver of the bobbin or other weft carrier, holder or support. The said bobbin receiver is herein represented as pivotally supported beneath the magazine, so that the bobbins may in turn be discharged thereinto and be ejected or transferred from the said receiver into the running shuttle in the shuttle box upon the lay of the loom. In the disclosed embodiment of the invention, the bobbin receiver is of a general U shape as indicated most clearly in Fig. 4. As there shown it has a base portion 40 and upright head and foot spring portions 41 and 42 which engage with suitable spring pressure the head 43 and the base 44 of the bobbin so as securely to hold it prior to and until it is transferred into the running shuttle. The said bobbin receiver is secured by bolts 45 to the head or upper end 46 of the lever 47 pivoted upon the stud 36 and having a downwardly extending arm 48.

The bobbin transferrer or ejector is herein typified as a lever also pivoted upon the stud 36 and having a downwardly extending arm 49 connected by a coil spring 50 to the arm 48 of the bobbin receiver supporting lever. The upper arm 51 of the said transferrer lever has a bent upper end 52 adapted to enter the bobbin receiver upon indication of filling fault and to transfer the bobbin therefrom to the running shuttle. The end of the said bent portion 52 of the transferrer lever has secured thereto a transversely extending rod 53 of a length substantially corresponding to that of the bobbin. Upon the end of the rod 53 nearest the head of the bobbin is suitably secured a striker head 54 having a V or other suitably shaped recess 55 which, as represented in Fig. 6, receives the head of the bobbin and securely supports the same during the transferring action. Upon the opposite end of the rod 53 is a suitable projection or striker head 56 which is suitably shaped and recessed, as indicated in Fig. 6, to engage the base of the bobbin. Thus the bobbin is firmly supported and engaged at both ends during the transferring action.

It has previously been stated that the shaft 15 is rocked upon filling failure. In order to effect, upon the rocking of the shaft 15, the discharge of a bobbin from the magazine to the bobbin receiver and the transfer of said bobbin from the receiver to the running shuttle, we have in this embodiment of the invention represented the said shaft 15 as having suitably mounted thereon a magazine operating lever 57, the upper end whereof takes behind a lug or ear 58 upon one of the levers 22 of the gate 20, as indicated most clearly in Figs. 3, 4, 5 and 6.

Thus the rocking of the shaft 15 moves the bottom gate 20 to the left, viewing Fig. 6, and permits the discharge of the bottommost bobbin into the bobbin receiver, the gate 21 entering the magazine between the discharged bobbin and the next lowermost bobbin as previously described. To the said lever arm 22 is connected one end of a coiled spring 59, the other end of which is connected to a bracket 60 suitably attached to and extending from the magazine wall. Upon the return of the magazine operating lever 57 to normal position, the spring 59 swings the gates 20, 21 to the right viewing Figs. 3, 5, 6, thus permitting all the bobbins in the magazine to drop until the lowermost is supported by the gate 20 in the position indicated in Fig. 6.

The means for operating the transferrer will next be described. As most clearly shown in Fig. 4, to the under side of the lay at 61 is attached a bracket 62, the function of which is to support the end of the lay and to serve as a guide for the picker stick. To this end the said bracket is composed of two parallel portions as most clearly indicated in Fig. 6, between which the picker stick moves in its picking action. To the under side of said bracket 62, the head 63 of a bracket is secured, the said bracket being of a double right angular form, the depending portion thereof being indicated at 64 and the foot being indicated at 65. The said foot constitutes a bunter and, as most clearly shown in Figs. 3, 5, 6, its function is to engage and actuate the transferrer latch. As shown in the said figures, the transferrer latch 66 is pivoted upon a bolt 67 tapped into the arm 49 of the transferrer lever. The inner end of the said latch is provided with a shoulder 68 having tapped therein the threaded end 69 of an adjustable latch head 70, the free end of which is recessed as indicated at 71, to receive the bunter 65. By adjustment of the head 70 the time of engagement of the bunter and latch and the extent of movement of the latter may be varied.

The opposite end of the latch 66 is suitably connected as herein represented by a link 72 to a lever arm 73 fast upon the said rock shaft 15. We have herein represented the upper end of the link 72 as passing loosely through a socket or opening in the lever 73 and as having a threaded end 74 receiving thereon nuts 75, so that the time and extent of rocking movement of the transferrer latch 66 may be varied as desired. Any other suitable connection and any suitable adjustment may, however, be provided. If desired and as represented in Fig. 5, a stop 76 may be provided upon which the transferrer latch 66 rests when in its down position.

Upon the rocking of the shaft 15, the lever 73 thereof lifts the link 72, and hence rocks the transferrer latch 66 upon its pivot from the position shown in Fig. 3 into the position shown in Figs. 5 and 6, thus bringing it into the path of movement of the bunter 70 65 upon the lay of the loom. Upon impingement of the bunter 65 against the transferrer latch 66, the latter is moved bodily toward the left into the position shown in Figs. 5 and 6, thus swinging the transferrer lever 51 from the position shown in Fig. 3 to the position shown in Figs. 5 and 6, thereby transferring the bobbin from the bobbin receiver into the running shuttle. Because of the fact that the coil spring 50 connects the lower ends of the transferrer lever 51 and the lever 47 of the bobbin receiver, the described movement of the transferrer lever to the position shown in Figs. 5 and 6 also results in the movement of the bobbin receiver in the same direction; that is, from the position shown in Fig. 3 to that shown in Figs. 5 and 6, or toward the lay of the loom. This inward movement of the bobbin receiver is, however, a yielding one, and as hereinafter described, the said bobbin receiver is met by the shuttle box upon its forward movement and with the result that the said bobbin receiver then partakes of the forward movement of the shuttle box and lay.

In order to prevent the untimely discharge of the bobbin from the bobbin receiver and also in order to hold the bobbin against the striker heads 54 and 56 of the transferrer, we have in this embodiment of the invention provided a member 77 which is pivoted at its upper end 78 to the lower portion of the front of the magazine, as clearly indicated in Fig. 3 and which may be spring pressed, as shown at 78' in Fig. 8. As the bobbin receiver is moved toward the right, viewing Fig. 3, the said member 77 contacts with the bobbin in the receiver and acts as a drag to confine or hold the bobbin against the striker heads, and thus secure a more effective snapping or transfer of the bobbin into the shuttle than would occur were the bobbin permitted to move slightly away from the heads 54 and 56 and permit lost movement to occur before the said heads could strike the bobbin and effect the transfer of the same into the shuttle.

In order to prevent relative displacement of the bobbin receiver and the transferrer when the same are in their normal position as indicated in Fig. 3, we preferably provide the bottom of the said bobbin receiver with one or more hooks 79 extending toward the front of the loom and adapted to take around the rod 53 of the transferrer lever, as indicated in said Fig. 3. This prevents undue inward movement of the said bobbin receiver.

As hereinbefore stated, the disclosed embodiment of the loom is provided with a single shuttle box at each end of the lay. The shuttle box at the left hand side of the loom, viewing Fig. 2, may be and preferably is of usual construction, and need not be particularly described. The shuttle box at the right hand side of the loom is, however, of peculiar construction and particularly in that it is mounted for partial rotation, so that as the lay moves forward toward the magazine, weft filling failure having been indicated, the said shuttle box is turned through one quarter revolution, thus bringing it into position to receive the new bobbin or other weft carrier and to permit the ejection of the spent bobbin through the bottom of the shuttle box. Thus the new bobbin is transferred into the shuttle through the top thereof, the shuttle being then turned or tipped through an angle of ninety degrees.

As represented more clearly in Figs. 4, 7, 8 and 10, the body or main portion of the lay has bolted or otherwise secured thereto an open or cage-like casting 80, the outer end of which is formed as a ring or annulus 81 having a tapered or inclined, inner surface, indicated in dotted lines at 82, and constituting a bearing for a corresponding ring or annulus 83 upon the shuttle box 84, the inner end of said ring 83 being tapered and extending into the said ring 81, so as to rock therein. The shuttle box 84 is provided with a front wall 85 and, as shown in Fig. 6, the upper edge of the said front wall is provided with a lip 87 to prevent displacement of the shuttle 88 from the shuttle box when the latter is in the position indicated in Fig. 6. The said shuttle box is provided with a binder 89, pivoted thereto at 90, and at its free end taking under an ear 91 upon the shuttle box. A suitable protector rod 92 is provided, as indicated in Fig. 6, this being mounted in any suitable manner and having secured thereto the usual binder finger 93, which extends upwardly, as indicated in Fig. 6, and terminates in a head 94, which engages the binder 89 adjacent its free end.

Inasmuch as the partial rotation of the shuttle box for transfer of the new bobbin will withdraw the binder from the binder finger, the latter would then be permitted to move inward and thus to rock the protector rod and stop the loom were it not for the provision of suitable means to maintain the binder finger in proper relation during such turning movement of the shuttle box. For this purpose and also for the purpose of holding the binder 89 in binding relation to the shuttle when the shuttle box is turned, and as most clearly represented in Fig. 6, the said binder is provided with a cam 95 suitably secured thereto and having a curved, outer face 96 which during the rocking of the shuttle box rides along the head 94 of the binder finger, with the result that the said binder finger is held in its inoperative position and the binder is held in binding relation to the shuttle.

It has been previously stated that the lay is provided with a bracket 62 extending toward the right, viewing Fig. 4. The said bracket at its outer end is inclined somewhat upward, as represented in said figure, and at its said end is provided with a T head 97, the downwardly extending portion of which is secured by a bolt 98 to the upper end of a brace member 99 extending upward from one of the brackets 10, as indicated most clearly in Fig. 2. Any other suitable means may be provided to support the said bracket 62.

The shuttle box at its outer end is arched, as indicated at 100, so as to provide a guideway or suitable space for the upper end 101 of the right hand picker stick 9. The bracket 62 is of peculiar importance in guiding the upper end of the picker stick inasmuch as the latter is not, as is usual, guided at all times in a longitudinal slot in the lay. The said picker stick head is provided with a suitable picker block 102, against which the point 103 of the shuttle 88 is received. The arch 100 of the shuttle box is provided at its outer end with a base or hub-like portion 104 which constitutes the second bearing of the shuttle box, the first bearing, as previously pointed out, being the ring or annulus 83. It will be observed that the said bearings 83, 104, are in line with the axis of the shuttle 88, and that the shuttle box is rotated about the axis of the said shuttle as an axis, so that the relation of the point 103 of the shuttle to the picker block 102 need not be disturbed. Thus there is maintained a fixed engagement between the point of the shuttle and the picker block.

The arch 100 permits the right hand shuttle box to be turned over the picker stick and picker. The latter is provided with a slot in which the right hand picker stick 9 moves to and fro, but the said picker stick, before it reaches the right hand limit of its stroke, viewing Figs. 2 and 4, withdraws from the said slot and enters the arch 100, at which time the upper end of the said picker stick is guided only by the divided bracket 62. When the right hand picker stick 9 is in the position shown in Figs. 2 and 4, the shuttle box is free to be turned to and from normal position. The arch 100 is suitably formed to permit the movement of the shuttle into the position shown in Figs. 2 and 4, and also to permit the right hand picker stick to pass through the left hand wall of said arch when throwing the shuttle to the left hand box of the loom.

The hub-like bearing 104 may be connected in any suitable manner to the head 97 of the brackets 62. As shown most clearly in Fig. 9, the said base or hub 104 is recessed and is provided with a removable portion 105, within which is received a bolt 106 having a head 107, and a coil spring 108, one end of which latter is secured to the bolt as indicated at 109, and the other end of which is secured in the base or hub 104, as indicated at 110. The inner end of the bolt is reduced as indicated at 111 and extends into a corresponding recess in the hub 104 and is provided with a pair of openings 112, 113 arranged at right angles to each other, and either one of which may be brought into line with a transverse opening through the hub 104. When either opening in the bolt is brought into alinement with the opening in the hub, a pin 114 may be passed therethrough, thus holding the parts in adjusted relation. In this manner, the tension of the spring 108 may be varied. The function of the said spring is to return the shuttle box to normal or upright position, after it has been turned through one quarter revolution, as hereinafter set forth.

As indicated in Figs. 3, 5 and 6, the under side of the shuttle box has therein an opening 115 for the ejection of the spent bobbin from the shuttle. The under side of the shuttle box is also provided with a bracket 116 having a terminal head 117, with which the hook 118 of the dog 33 engages upon the forward movement of the lay, the said dog being lifted into the path of movement of said terminal head through the rocking movement of the shaft 15. For this purpose there is provided a dog positioning lever 119 fast upon the said rock shaft and extending to a point underneath and so as normally to contact with the under side of the said dog 33, as indicated in full lines in Fig. 3. Upon indication of weft failure and the consequent rocking of the shaft 15, the dog positioning lever 119 lifts the dog into the position shown in dotted lines in Fig. 3, so that the hooked portion thereof engages the head 117 and upon the continued forward movement of the lay turns the shuttle box from its upright position shown in Fig. 3 through ninety degrees into the position shown in Fig. 6.

As previously stated, the weft cam 7 is cut away as indicated at 8, so that the rock shaft 15 is permitted to return by the weight of the parts or through the action of a suitable spring 15', to its normal position, moving the lever 57 toward the right, viewing Fig. 3, and permitting movement in the same direction of the magazine gates, and also returning the dog positioning lever 119 to its normal position, thereby permitting the said dog to return to its normal position, as indicated in Fig. 6. Thus the said dog is separated from the head 117, and in no wise interferes with the completion of the forward movement of the lay.

Preferably suitable means are provided to limit the rocking movement of the shuttle box. For that purpose there is represented in Fig. 6, a stop 120 suitably secured to the front side of the shuttle box, so that when the shuttle box is in its turned position as indicated in said figure, the end of the stop takes against the end 121 upon the lay sword, as most clearly shown in Fig. 8. Preferably also the said end of the lay has tapped therein a set screw 122, with which the underside of the shuttle box engages when the shuttle box is returned to normal position through the agency of the coil spring 108.

As clearly evident from the foregoing description, upon indication of filling fault, the shaft 15 is rocked in a contraclockwise direction, viewing Fig. 6, thus through the instrumentality of the lever 57 operating the gates of the magazine so as to permit a single bobbin to drop into the bobbin receiver. This occurs during the forward movement of the lay and simultaneously with the movement of the magazine operating lever 57, the lever 119 is elevated, thereby lifting the dog 33 into the path of the head 117 upon the shuttle box, so that in the continued forward movement of the lay and shuttle box, the latter is turned through ninety degrees. Thereupon as described the lever 119 is permitted to return to its normal position, thus permitting the dog 33 to drop to the position indicated in full lines in Fig. 3. The described rocking of the shaft 15 in a contraclockwise direction, through the instrumentality of the lever 73 positions the transferrer latch 66 with its head in the path of movement of the bunter 65, but although the lever 73 is returned to the normal position shown in Fig. 3 upon the rocking of the shaft 15 in a clockwise direction, the transferrer latch is not returned to the normal position shown in Fig. 3 until the lay has begun its backward beat and has withdrawn the bunter 65 from the recessed head of the transferrer latch. Because of the loose connection between the link 72 and the lever 73, this delayed return of the transferrer latch to normal position is permitted. When the head of the transferrer latch is brought into the path of movement of the bunter 65, the transferrer 51 is swung in a clockwise direction, viewing Fig. 6, so as to transfer the bobbin from the bobbin receiver into the turned shuttle, and after the transfer movement is effected, the transferrer is returned to normal position through the agency of the spring 50. To prevent over movement of the transferrer lever in its return to normal position, there is preferably provided an adjusting screw 123 which is tapped into a lug or ear 124 projecting from the loom frame.

The described movement of the transferrer in a clockwise direction or to the right, viewing Fig. 3, also effects through the agency of the spring 50 a corresponding movement of the bobbin receiver, the result being that the said bobbin receiver is moved yieldingly toward the shuttle box simultaneously with the movement of the shuttle box toward the bobbin receiver. Preferably the upper end of the lever 47 of the bobbin receiver is provided with a stop 125, with which the lip 87 of the turned shuttle box contacts. Upon engagement of the bobbin receiver and the shuttle box, the inward motion of the former ceases and it then partakes of the forward movement of the shuttle box during which continued forward movement of the shuttle box, the transfer of the bobbin from the bobbin receiver to the turned shuttle box is completed.

The lateral transfer of the bobbin from the bobbin receiver to the turned shuttle is of marked advantage in that the transfer movement is initiated during the movement of the bobbin receiver and the shuttle box toward each other, and is completed during the movement of the bobbin carrier and the shuttle box toward the front of the loom. Therefore the length of time which may be occupied in transferring the bobbin to the shuttle is greatly increased. This insures not only a more easy operation of parts and one less liable to result in breakage, but it also insures a more accurate placing of the bobbin in the shuttle. The exhausted bobbin is driven through the bottom of the shuttle by the new bobbin, such exhausted bobbin falling to the floor, or into a suitable receptacle which may be provided.

The dog 33 is restored to normal or inactive position during the forward beat of the lay and at a time when the transferrer is entering or has entered the shuttle. The transfer of the fresh bobbin to the shuttle is completed and then the shuttle box is turned back into upright position by means of the spring 108. Such shuttle-box-restoring action of the spring occurs preferably upon the commencement of the backward beat of the lay, though obviously this timing of the action of the parts may be varied within the scope of the invention.

Having thus described one illustrative embodiment of our invention, we desire it to be understood that although specific terms are employed, they are used in a generic and descriptive sense and not for purposes of limitation, the scope of the invention being set forth in the following claims.

Claims:

1. In a weft replenishing loom, a bobbin magazine, a shuttle box, a movable supporting arm in which said box is pivotally mounted, said shuttle box having an arch at one end to accommodate the picker stick, a guide on the arm for the picker stick, an oscillatory transfer lever, a member controlled by the filling failure and adapted to be disposed in the path of movement of the shuttle box in its movement toward the magazine, whereby said box is turned in its supporting arm to dispose the open side of the box contiguous to the discharge end of the magazine, and connecting means between said member and the transferring lever to automatically transfer a filled bobbin from the magazine to the shuttle.

2. In a weft replenishing loom, a bobbin magazine, a shuttle box, a movable arm member in which said shuttle box is mounted, as oscillatory transferring member, a shaft, arms fixed on said shaft, a lever, a link connection between one of said arms and said lever, a part operative connected to the other arm, a member on the shuttle box and a filling feeler device to engage said part and move the same into the path of the member on the shuttle box when said box moves toward the magazine to turn the box in its supporting arm, and transfer a filled bobbin from the magazine to the shuttle and simultaneously to force the empty bobbin from the shuttle.

3. A weft-replenishing loom having a shuttle box, pivotal end supports therefor, and means to turn the same upon the axis of its contained shuttle, picker sticks, the pivotally mounted shuttle box and the adjacent picker stick being relatively formed and supported to permit the turning movement of the shuttle box.

4. A weft-replenishing loom having a shuttle box adapted to turn upon the axis of its contained shuttle, pivotal end supports for the box, picker sticks, the pivotally mounted shuttle box and the adjacent picker stick being relatively formed and supported to permit the turning movement of the shuttle box, and co-acting weft-replenishing mechanism.

5. A loom having a shuttle box provided with bearings at its opposite ends, the axes for said bearings being co-incident with the axis of the contained shuttle, picker sticks, the pivotally mounted shuttle box and the adjacent picker stick being relatively formed and supported to permit the turning movement of the shuttle box.

6. A loom having a shuttle box mounted for turning movement, said box having an arched bearing at one end to accommodate the picker stick and a pivotal support at the opposite end.

7. A loom having a shuttle box mounted for turning movement, said box having an arched bearing at one end to accommodate the head of the picker-stick, and an annular bearing at its opposite end.

8. A weft-replenishing loom having a lay, weft-replenishing instrumentalities, a shuttle box mounted for turning movement, end bearings for said shuttle box co-axial with the shuttle, picker sticks, the pivotally mounted shuttle box and the adjacent picker stick being relatively formed and supported to permit the turning movement of the shuttle box, and means to turn the shuttle box for replenishment during the forward beat of the lay.

9. A weft-replenishing loom having a lay, a shuttle box mounted for turning movement on its own axis, weft-replenishing instrumentalities, co-acting means to turn the shuttle box for replenishment during the forward beat of the lay, a picker stick adjacent to said box, and means extraneous to the shuttle box to guide said picker stick during the said turning movement.

10. A loom comprising, in combination, a lay, a shuttle box mounted thereon and adapted to be turned upon its own axis, said box having end bearings co-axial with the shuttle, picker sticks, the pivotally mounted shuttle box and the adjacent picker stick being relatively formed and supported to permit the turning movement of the shuttle box, and co-acting means to turn said box during the forward beat of the lay.

11. A loom having a lay, a shuttle box mounted thereon for turning movement, a picker-stick and means whereby the point of the contained shuttle may maintain fixed engagement with the picker stick during the turning of the shuttle box.

12. A loom having a lay, a shuttle box mounted thereon for turning movement on the axis of its contained shuttle, a picker stick, and means whereby the point of said contained shuttle may maintain fixed engagement with the picker stick during the turning movement of the shuttle box.

13. A loom having a lay, a shuttle box mounted for turning movement upon the axis of the contained shuttle, a protector member and means for holding said member inoperative during the turning of the shuttle box.

14. A loom comprising, in combination, a lay, a shuttle box mounted thereon for turning movement, a protector finger adapted to engage said box, and a cam upon said shuttle box to hold said protector finger inoperative during turning movement of the shuttle box.

15. A weft-replenishing loom having a lay, a shuttle box mounted for turning movement thereon, end bearings for the box co-axial with the shuttle, picker sticks, a pivotally mounted shuttle box being shaped to clear the adjacent picker stick when said box is in turned position, weft-replenishing means, and co-acting devices to effect the turning of the shuttle box and the transfer of filling thereto during the forward beat of the lay.

16. A weft-replenishing loom having a filling carrier magazine, a pair of discharge controlling gates oppositely movable one into and the other from confining position, replenishing indicating mechanism, operating connections between said mechanism and said gates, a filling carrier at rest beneath said magazine, means to discharge filling carriers from said rest, and a shuttle box mounted for turning movement, into the contained shuttle of which the filling carrier is adapted to be moved by said discharging means.

17. A weft-replenishing loom having a replenishment indicating rock-shaft, a filling carrier magazine having a pair of carrier confining gates oppositely movable one into and the other from confining position, operative connections between said rock-shaft and said gates, a filling carrier at rest beneath said magazine, means to discharge filling carriers from said rest, and a shuttle box mounted for turning movement, into the contained shuttle of which the filling carrier is adapted to be moved by said discharging means.

18. A weft-replenishing loom having a filling carrier magazine, a pair of gates pivotally mounted thereon for swinging movement into and out of the path of discharge of the filling carriers, weft-replenishment indicating means to move said gates in one direction, spring means to move said gates in the opposite direction, a filling carrier rest beneath said magazine, a shuttle box, and a transferrer to move a filling carrier from the rest into the shuttle box.

19. A weft-replenishing loom having a magazine, a receiver for filling carriers mounted adjacent thereto, and a drag device upon said magazine and positioned to engage a filling carrier between the ends thereof and co-acting with said receiver.

20. A weft-replenishing loom having an upright magazine for filling carriers, a receiver for said filling carriers movable to and fro in a transverse path beneath said magazine, means for discharging the filling carrier from the magazine into the receiver, means movable in said receiver to eject the filling carrier therefrom, and a rotatable shuttle box into which the filling carrier is forced by said ejecting means.

21. A weft-replenishing loom having an upright filling carrier magazine, a receiver mounted beneath the same, and means to move said receiver to and fro in a transverse path, a shuttle box, and means to turn the shuttle box for the reception of a filling carrier from the said carrier.

22. A weft-replenishing loom having an upright magazine for filling carriers, a receiver for said filling carriers pivoted for movement to and fro beneath said magazine, co-acting means for effecting discharge of said filling carriers singly to said receiver, means movable in the receiver to eject the filling carrier therefrom and a rotatable shuttle box into which the filling carrier is forced by said ejecting means.

23. A weft-replenishing loom having a magazine, and a coöperating receiver positioned below the magazine to which filling carriers may be transferred from the magazine, said receiver being mounted independently of the magazine for yielding movement, an ejector below said magazine and movable relatively to and fro in said receiver, and a rotatable shuttle box into which the filling carrier is forcibly ejected by said receiver.

24. A weft-replenishing loom having a lay, a magazine and a carrier to which filling carriers may be transferred from said magazine, said carrier having a yielding movement toward said lay and also a movement with the lay.

25. A weft-replenishing loom having a magazine for filling carriers, a receiver mounted beneath the same to receive filling carriers by gravity therefrom, a lay, and means yieldingly to move said receiver toward said lay in a path beneath said magazine, and an ejector in said receiver to force the filling carrier into the shuttle.

26. A weft replenishing loom having a magazine for filling carriers, a receiver mounted beneath said magazine to receive said filling carriers, a movable support for said receiver, a lay, a shuttle box mounted for turning movement, means yieldingly to move said receiver toward the lay during the forward beat of the loom, means to effect the return of the receiver with the lay, and an ejector to force the filling carrier from said receiver into the shuttle.

27. A weft-replenishing loom having a lay, a magazine for filling carriers, and a receiver mounted beneath said magazine to receive filling carriers therefrom, said receiver having yielding to-and-fro movements, the return movement of the carrier occurring with the movement of the lay in the same direction.

28. A weft-replenishing loom having a lay, a magazine for filling carriers, a receiver to which said filling carriers may be transferred from said magazine, means yieldingly to move said receiver toward said lay, said receiver having a gravity induced movement in the opposite direction, an ejector, and means to effect the periodic conjoint movement of the receiver and lay.

29. A weft replenishing loom having a lay, a shuttle box mounted for turning movement, a magazine for filling carriers, a receiver to which filling carriers may be transferred from said magazine, said receiver having a movable support permitting movement thereof toward the lay and also with the lay, and means to eject the filling carrier from said receiver into the shuttle in the shuttle box.

30. A weft replenishing loom having a lay, a receiver for filling carriers mounted for movement toward and from the lay, means to permit filling carriers singly to drop into said receiver, means yieldingly to move said receiver toward the lay during the forward beat of the latter, but permitting return of said receiver with the lay during a portion of the forward beat of said lay, and an ejector to force the filling carrier from said receiver into the shuttle upon the lay.

31. A weft-replenishing loom having a lay, a pivoted receiver for filling carriers, and means to rock said receiver upon its pivot toward said lay, an ejector, the construction and relation of parts permitting a movement of said receiver with said lay.

32. A weft-replenishing loom having a lay, a pivoted receiver for filling carriers, means to rock said receiver upon its pivot toward said lay, a filling carrier ejector movable relatively to and in the receiver, the construction and relation of parts permitting a movement of said receiver with said lay during a portion of the forward beat of the latter.

33. A weft-replenishing loom having a lay, a receiver for filling carriers, means yieldingly to move said receiver toward said lay during a portion of the forward beat of the latter, said receiver having means permitting it to yield and move with the lay in the opposite direction during the terminating portion of the forward beat of the lay, and an ejector to force a filling carrier from said receiver into the shuttle upon the lay.

34. A weft-replenishing loom having a lay, a receiver for filling carriers, a transferrer, and means to effect movement of the receiver toward the lay by said transferrer.

35. A weft-replenishing loom having a lay, a receiver mounted for movement toward and from the lay, a transferrer, and co-acting connections to effect movement of said receiver by said transferrer.

36. A weft-replenishing loom having a lay, a receiver, a transferrer, and means to effect movement of said receiver toward the lay by said transferrer, during the forward beat of the lay.

37. A weft-replenishing loom having a lay, a receiver for filling carriers, a transferrer, and co-acting connections between said receiver and transferrer to effect movement of the receiver toward the lay and the transfer of filling carriers from the receiver to the lay during the forward beat of the latter.

38. A weft-replenishing loom having a lay, a magazine for filling carriers, a receiver to receive the filling carriers from the magazine, said receiver being movable away from the magazine toward the lay, a transferrer, and means to effect, during a movement of the lay in a single beat, the discharge of a filling carrier from the magazine and the transfer of a filling carrier from the receiver to the lay.

39. A weft-replenishing loom having a lay, a magazine for filling carriers, a receiver to receive filling carriers from said magazine, said receiver being movable away from the magazine toward the lay, a transferrer, and co-acting means to effect, during the movement of the lay in its forward beat, the discharge of a filling carrier from said magazine into said receiver, and the transfer of a filling carrier from said receiver onto said lay.

40. A weft replenishing loom having a receiver for filling carriers, a transferrer periodically movable into said receiver to eject filling carriers therefrom into the shuttle, a shuttle box for the shuttle, and means periodically to rock said shuttle box about the axis of the shuttle, said receiver having spring means to engage the head and foot of the filling carrier.

41. A weft-replenishing loom having a lay, a receiver for filling carriers and a transferrer co-acting therewith, said receiver and transferrer being coaxially pivoted.

42. A weft-replenishing loom having a lay, and a receiver for filling carriers said receiver being mounted for gravity induced movements toward the front of the loom and means movable toward the lay to transfer filling carriers from said receiver to the lay.

43. A weft-replenishing loom having a lay, a receiver for filling carriers, a transferrer and co-acting means to effect movement of said receiver in one direction by said transferrer, said receiver having a gravity induced movement in the opposite direction.

44. A weft-replenishing loop having a lay, a pivoted receiver for filling carriers, a transferrer, and co-acting means to effect movement of said receiver in one direction by said transferrer, said receiver having a gravity induced movement in the opposite direction.

45. A weft-replenishing loom having a lay provided with a shuttle box, a magazine, a movable receiver co-acting with said magazine, a transferrer for replenishing filling carriers from the receiver, and connections for operating said transferrer by said lay upon the forward beat of the latter and for inserting the carriers laterally into the shuttle box.

46. A weft-replenishing loom having a lay provided with a shuttle box, a magazine for filling carriers, a receiver to receive filling receivers from said magazine, a transferrer to transfer filling carriers from the receiver to the lay, provisions whereby the filling carriers are inserted laterally into the shuttle box, and co-acting means for operating the transferrer by the lay upon the forward beat of the lay.

47. A weft-replenishing loom having a lay, a receiver for filling carriers, a transferrer to effect transfer of filling carriers from the receiver to the lay, and means to cause the transferrer to enter the receiver, and said receiver and transferrer to move toward the lay.

48. A weft-replenishing loom having a lay, a receiver for filling carriers, a transferrer to effect transfer of filling carriers from the receiver to the lay, and means to cause the transferrer to enter the receiver, and said receiver and transferrer to move toward the lay during the forward beat of the latter.

49. A weft-replenishing loom having a lay, a receiver for filling carriers, a transferrer, and co-acting means for effecting entry of the transferrer into the receiver, and movement of the transferrer and receiver toward the lay with subsequent movement of the receiver with the lay during the forward beat of the latter.

50. A weft-replenishing loom having a lay, a receiver for filling carriers, a transferrer, means to cause said transferrer to enter the receiver and to transfer a filling receiver therefrom to the lay, and co-acting means for effecting movement of the receiver with the transferrer during a portion of the transferring movement of the latter, and movement with said lay during a portion of the forward beat of the lay.

51. A weft-replenishing loom having a lay, a receiver for filling carriers from the magazine, a transferrer to effect transfer of filling carriers from the receiver to the lay, and yielding connections between the transferrer and the receiver.

52. A weft-replenishing loom having a lay, a magazine, a receiver for filling carriers from the magazine, a transferrer to effect transfer of the carriers from the receiver to the lay, and spring connections between the transferrer and the receiver.

53. A weft-replenishing loom having a lay, a receiver for filling carriers, a transferrer to transfer filling carriers from the receiver to the lay, and co-acting means for effecting operation of the transferrer by the lay and of the receiver by the transferrer.

54. A weft-replenishing loom having a lay, a receiver for filling carriers, a transferrer to transfer filling carriers from the receiver to the lay, and a movable latch mounted upon the transferrer for effecting movement of the transferrer and the receiver.

55. A weft-replenishing loom having a lay provided with a shuttle box, a rock-shaft, means to rock the same upon indication of filling fault, a receiver for filling carriers, a transferrer to transfer filling carriers from the receiver to the lay, and a latch mounted upon the transferrer and adapted to be operatively positioned by indicating movement of said rock-shaft and provisions for effecting lateral insertion of the filling carriers into the shuttle box by the transferrer.

56. A weft-replenishing loom having a lay, a receiver for filling carriers, a transferrer for effecting transfer of filling carriers from the receiver to the lay, a rock-shaft, means for rocking the same upon filling fault, and a latch connected to said rock-shaft and adapted to be operatively positioned by indicating movement thereof, thereby to effect transferring movement of the transferrer and the receiver.

57. A weft-replenishing loom having a lay provided with a shuttle box, a magazine, a movable receiver coacting with said magazine, a rock-shaft mounted for movement upon filling fault, a transferrer, a latch connected to said transferrer and operatively connected to the rock-shaft thereby to be positioned for transferring movement upon indicating movement of the rock-shaft, and provisions whereby the transferrer inserts the filling carriers laterally into the shuttle box.

58. A weft-replenishing loom having a magazine, a receiver, a lay provided with a shuttle box, a rock-shaft mounted for indicating movement upon filling fault, a transferrer co-acting with said receiver, a latch for operating the transferrer, and lost-motion connections between said latch and said rock-shaft and provisions whereby the filling carriers are inserted by the transferrer laterally into the shuttle box.

59. A loom having a lay, a shuttle box mounted for turning movement thereon, a shuttle binder provided with a cam, and means engaging said cam to maintain said binder in binding relation to the contained shuttle during the turning movement of the box.

60. A weft-replenishing loom having a lay provided with a magazine, a receiver, a shuttle box, a transferrer to position filling carriers in said shuttle box from the receiver, and means for effecting movement of said transferrer in one direction by the lay, said transferrer having a gravity-impelled movement in the opposite direction.

61. A weft-replenishing loom having a lay provided with a shuttle box, a magazine for filling carriers, a receiver, a transferrer movable in a transverse path beneath the magazine into the carrier, and means for moving said transferrer toward the lay during the forward beat of the lay.

62. A weft-replenishing loom having a lay provided with a shuttle box, a magazine, and means for transferring filling carriers laterally from the magazine to the shuttle box including a receiver and a transferrer latch having an adjustable head.

63. A weft-replenishing loom having a lay provided with a shuttle box pivoted in movement about the axis of the contained shuttle, a magazine for filling carriers, a receiver for filling carriers from the magazine and a transferrer to move filling carriers from the receiver into the shuttle box, said transferrer having strikers to engage the head end and base of the carrier.

64. A weft-replenishing loom having a lay provided with a shuttle box, a magazine for filling carriers, a receiver to receive filling carriers from the magazine, a transferrer having strikers to engage the head end and base of the filling carrier in the receiver, and means mounted upon the magazine to maintain the filling carrier against said strikers.

65. A weft-replenishing loom having a lay provided with a shuttle box mounted for turning movement, picker sticks, the said shuttle box having a formation to clear the adjacent picker stick when turned, a shaft mounted for rocking movement upon indication of filling fault, and coacting connections for turning said shuttle box upon rocking movement of said shaft.

66. A weft-replenishing loom having a lay provided with a shuttle box mounted for turning movement, picker sticks, the said shuttle box having a formation to clear the adjacent picker stick when turned, a shaft mounted for rocking movement upon indication of filling fault, a hook for turning said shuttle box, and means operated upon rocking movement of said shaft for operatively positioning said hook.

67. A weft-replenishing loom having a lay provided with a shuttle box mounted for turning movement, a shaft mounted for rocking movement upon indication of filling fault, a hook for turning said shuttle box, and a lever carried by said rock shaft to move said hook into the path of said shuttle box.

68. A weft-replenishing loom having a lay provided with a shuttle box mounted for turning movement, said shuttle box having a projection, a hook adapted to be lifted into the path of said projection, and means rendered operative by indication of filling fault to lift said hook.

69. A loom having a lay, a shuttle box mounted for turning movement thereon in substantially the axis of the contained shuttle, a shuttle binder, and means to maintain said binder in binding relation to the contained shuttle during the turning movement of the box.

70. A weft-replenishing loom provided with a lay having a shuttle box mounted for turning movement, a weft cam and operative connections between said weft cam and said shuttle box for turning the latter, said weft cam being shaped to permit the shuttle box turning means to become inactive before the completion of that beat of the lay during which the shuttle box is turned.

71. A weft-replenishing loom having a lay provided with a shuttle box mounted for turning movement, a weft cam, and operative connections between said weft cam and said shuttle box for turning the latter during the forward beat of the lay, said weft cam being shaped to permit said shuttle box turning means to become inactive before the completion of the forward beat of the lay during which turning of the shuttle box is effected.

72. A weft-replenishing loom having a lay provided with a shuttle box, a magazine for filling carriers, means for permitting the discharge of successive filling carriers from said magazine, a weft cam, and operative connections between said cam and said shuttle box to effect the discharge of a filling carrier from said magazine, said weft cam being shaped to permit the return to inoperative position of the filling carrier discharging means prior to the completion of that beat of the lay during which the discharge of the filling carrier occurs.

73. A weft-replenishing loom having a lay provided with a shuttle box, a magazine for filling carriers, means permitting the successive discharge of filling carriers from said magazine, a weft cam, and operative connections between said weft cam and said magazine for effecting the discharge of a filling carrier from the magazine during a forward beat of the lay, said weft cam being shaped to permit the return of said magazine operating means to inoperative movement prior to the completion of that forward beat of the lay during which such discharging movement occurs.

74. A loom having a lay provided with a shuttle box mounted for turning movement, the support for the shuttle box being shaped to accommodate the end of the picker stick, and means for guiding the picker stick between the ends of the shuttle box when said shuttle box is in turned position.

75. A loom having a lay provided with a shuttle box mounted for turning movement upon its axis, said shuttle box having at one end an arched support to accommodate the head of the picker stick, and a guide arm for the picker stick beneath said shuttle box.

76. A weft-replenishing loom having a lay provided with a shuttle box, a magazine for filling carriers, and a pivoted receiver to receive filling carriers from said magazine, said receiver being mounted for free rocking movement upon its pivot and means for effecting lateral transfer of a filling carrier from said pivoted carrier into the shuttle box.

77. A loom having a shuttle box mounted for turning movement upon its axis, picker sticks, said shuttle box being shaped to clear the adjacent picker stick when in turned position, means to turn said shuttle box in one direction, said means being normally out of engagement with the shuttle box, and a spring to return said shuttle box.

78. A loom having a lay provided with a shuttle box mounted for turning movement, end bearings for the box co-axial with the shuttle, picker sticks, said shuttle box being shaped to clear the adjacent picker stick when in turned position, means to effect turning movement of said shuttle box and stops to limit the turning movement of said box in each direction.

79. A weft-replenishing loom having a lay provided with a shuttle box, a magazine for filling carriers, a receiver to receive filling carriers from said magazine, a transferrer to transfer filling carriers from said receiver to the shuttle box, and a hook on the said receiver to prevent excess movement thereof relative to the transferrer.

80. A loom having a lay provided with a shuttle box mounted for turning movement about the axis of the shuttle, picker sticks, the said shuttle box being shaped to clear the adjacent picker stick when in turned position, and means to turn said shuttle box during a forward beat of the lay while maintaining the adjacent picker stick in line with the axis of the shuttle and to restore said shuttle box during the ensuing backward beat of the lay.

81. A weft-replenishing loom provided with a lay having a shuttle box, means to rotate said shuttle box upon the axial line of the contained shuttle, a rock shaft having means to effect turning thereof upon indication of filling fault, a magazine for filling carriers, a receiver to receive filling carriers from the magazine, a transferrer to transfer filling holders from the receiver to the shuttle box, and means mounted upon said rock shaft to effect replenishing movement of filling carriers from said magazine, and movement of said receiver and said transferrer.

82. A weft-replenishing loom having a lay provided with a shuttle box, a rock shaft, and means to rock the same upon indication of filling fault, a magazine having a filling carrier controlling gate, a receiver to receive filling carriers from said magazine, a transferrer to transfer filling carriers from the receiver to the shuttle box, and levers mounted upon said rock shaft and respectively coacting upon filling fault with said magazine gate, said receiver and said transferrer.

83. A weft-replenishing loom having a lay provided with a shuttle box mounted for turning movement, a rock shaft having means for turning the same upon filling fault, a magazine for filling carriers having a discharge controlling gate, a receiver to receive filling carriers from said magazine, a transferrer to transfer filling carriers from the receiver to the magazine, and three levers mounted upon said rock shaft adapted respectively to operate said magazine gate, said turning shuttle box, and said receiver and transferrer.

84. A weft-replenishing loom having a lay provided with a shuttle box, means to rotate said shuttle box upon the axial line of the contained shuttle, a magazine, a receiver for filling carriers from the magazine, and a co-acting pivotally mounted transferrer, said transferrer being mounted for free rocking movement upon its pivot.

85. A loom having a lay, a shuttle box mounted thereon for turning movement, a picker stick having a picker block, and means whereby the point of the contained shuttle may maintain fixed engagement with the picker block during the turning of the shuttle box.

86. A weft replenishing loom having a shuttle box, means to turn the same upon the axis of its contained shuttle, and means to guide the picker stick between the ends of the said box when the latter is in turned position.

87. A weft replenishing loom having a shuttle box adapted to turn upon the axis of its contained shuttle, said shuttle box having at one end an arched support to accommodate the head of the picker stick, hooked means adapted to engage with and to turn said shuttle box, and co-acting weft replenishing mechanism.

88. A weft replenishing loom having a shuttle box, means to turn the same upon the axis of its contained shuttle, a binder, and means to prevent said binder from loom stopping movement during turning of the box.

89. A weft replenishing loom having a shuttle box, and a pivoted member to turn said shuttle box upon the axis of its contained shuttle, the shuttle box having its outer end shaped to clear the adjacent picker stick when in turned position.

90. A weft replenishing loom having a shuttle box and a member normally out of engagement with the shuttle box but adapted to be engaged therewith and to turn said box upon the axis of its contained shuttle.

91. A weft replenishing loom having a shuttle box, and means adapted to be lifted into engagement with said box, and to turn the same upon the axis of its contained shuttle.

92. A loom having a lay, a shuttle box mounted thereon for turning movement, and a picker stick, said shuttle box having an arched member projecting from the outer end thereof to accommodate the picker stick during the turning movement of the shuttle, whereby the contained shuttle may maintain fixed engagement with the picker stick during such turning movement.

93. A loom comprising in combination, a lay, a shuttle box mounted thereon and adapted to be turned on its own axis, a picker stick adjacent to said shuttle box, and means for maintaining the picker stick in line with the axis of the shuttle during the turning movement of the box.

94. A weft replenishing loom having a lay, a shuttle box mounted for turning movement thereon, end bearings for the box co-axial with the shuttle, weft replenishing means, co-acting devices to effect the turning of the shuttle box, and the transfer of filling thereto during the forward beat of the lay, a protector device, and means to hold the same inoperative during the turning of the shuttle box.

95. A loom having a lay, a single shuttle box mounted for turning movement, a protector member, and means pertaining to said box and coöperating with said protector mechanism to hold the latter inoperative during the turning movement of the shuttle box.

96. A weft replenishing loom having a filling carrier magazine, and a coöperating receiver so positioned as to receive filling carriers by gravity therefrom, means to impart to and fro movement to said receiver, and an ejector for the filling carrier therein, and a rotatable shuttle box into which the filling carrier is forced by said ejector.

97. A weft replenishing loom having a filling carrier magazine and a coöperating receiver so positioned as to receive filling carriers by gravity therefrom, means to permit said gravity discharge, means to impart to and fro movement to said receiver, filling carrier-ejecting means movable in said receiver, and a rotatable shuttle box into which the filling carrier is adapted to be forced by said ejecting means.

98. A weft replenishing loom having a filling carrier magazine, and a coöperating receiver so positioned as to receive filling carriers by gravity therefrom, means to impart transferring movement to said receiver, an ejector movable transversely through the receiver, and a rotating shuttle box into which the filling carrier is adapted to be forced by said ejector.

99. A weft replenishing loom having a filling carrier magazine and a coöperating receiver so positioned as to receive filling carriers by gravity therefrom, means to impart transferring movement to said receiver, a shuttle box, having an arched end to receive and accommodate the picker, and means to turn said shuttle box for the reception of a filling carrier from said receiver, without disengagement of the shuttle box and picker.

100. A weft replenishing loom having a filling carrier magazine and a coöperating receiver so positioned as to receive filling carriers by gravity therefrom, a shuttle box, said receiver being movable for transfer toward the shuttle box, and said shuttle box being mounted for turning movement and having an arched portion extending from the outer end thereof to accommodate the picker stick and permit engagement of the shuttle box and stick during turning movement of the latter, and means co-acting with the receiver to insert filling carriers laterally therein.

101. A weft replenishing loom having a filling carrier magazine, a coöperating receiver, a shuttle box, said shuttle box being mounted for turning movement and having an arch to receive the picker stick, said receiver being movable for transfer toward the shuttle box, and means coöperating with the receiver to insert filling carriers laterally in said shuttle box.

102. A weft replenishing loom having a filling carrier magazine, a coöperating receiver, a shuttle box, mounted for turning movement on the axis of its shuttle, said box having an arch to receive the picker stick and permit engagement of the stick and box during said turning movement, and means to effect movement of said receiver with the lay.

103. A weft replenishing loom having a filling carrier magazine, a coöperating receiver, a shuttle box, mounted for turning movement upon the axis of the contained shuttle, said box having an arch extending from the outer end thereof to receive and accommodate the picker stick and permit engagement of the shuttle and picker during the turning movement of said box, on the lay, means to move said receiver toward the lay, and means to effect movement of said receiver with the lay.

104. A weft replenishing loom having a filling carrier magazine, a coöperating receiver, a shuttle box mounted for turning movement upon the axis of the contained shuttle, said box having an arch extending from the outer end thereof to receive and accommodate the picker stick and permit engagement of the shuttle and picker during the turning movement of said box, means to move said receiver toward the lay, and means to effect movement of said receiver with the lay during transfer of the filling carrier to the shuttle box and a transferrer coöperating with the receiver.

105. A weft replenishing loom having a filling carrier magazine, a coöperating receiver, a shuttle box mounted for turning movement upon the axis of the contained shuttle, said box having an arch extending from the outer end thereof to receive and accommodate the picker stick and permit engagement of the shuttle and picker during the turning movement of said box, means to turn the same, and means coöperating with the receiver to insert filling carriers laterally in said shuttle box.

106. A weft replenishing loom having a filling receiver magazine, a lay having a shuttle box mounted for turning movement upon the axis of the contained shuttle, said box having an arch extending from the outer end thereof to receive and accommodate the picker stick and permit engagement of the shuttle and picker during the turning movement of said box, a carrier coöperating with said magazine and movable toward and from the lay, and means to transfer a filling carrier from said receiver to the shuttle box during the forward beat of the lay.

107. A weft replenishing loom having a filling carrier magazine, a lay having a shuttle box, a carrier having a to and fro movement and coöperating with said magazine, and means to transfer a filling carrier from said carrier to the shuttle box during the forward beat of the lay.

108. A weft replenishing loom having a filling carrier magazine, a lay having a shuttle box, a carrier having a to and fro movement and coöperating with the magazine, a transferrer, and means whereby a filling carrier is transferred to said shuttle box by the transferrer during the forward beat of the lay.

109. A weft replenishing loom having a filling carrier magazine, a lay having a shuttle box, a to and fro movable carrier to receive filling carriers from the magazine, and means whereby the filling carriers are inserted through the agency of the carrier laterally into the shuttle box.

110. A weft replenishing loom having a filling carrier magazine, a lay having a shuttle box, mounted for rocking movement about the axis of the contained shuttle, said box having an arch extending from the outer end thereof to receive the picker and permit engagement of the shuttle, and picker during the turning movement of the shuttle box, a receiver to receive filling carriers from the magazine and movable toward and from the lay, a transferrer coöperating with the receiver, and means whereby the filling carriers are inserted by the transferrer laterally into the shuttle box.

111. A weft replenishing loom having a lay provided with a shuttle box, mounted for rocking movement about the axis of the contained shuttle, said box having an arch extending from the outer end thereof to receive the picker and permit engagement of the shuttle, and picker during the turning movement of the shuttle box, a magazine for filling carriers, a receiver to receive filling carriers from said magazine and movable toward and from the lay, a transferrer to transfer filling carriers from the receiver to the lay, and provisions whereby the filling carriers are inserted laterally into the shuttle box.

112. A weft replenishing loom having a lay provided with a shuttle box, a magazine, a movable receiver coöperating therewith, a transferrer to position filling carriers laterally in said shuttle box from the receiver, and means for effecting movement of said transferrer in one direction by the lay, said transferrer having a gravity-impelled movement in the opposite direction.

113. A weft replenishing loom having a lay provided with a shuttle box, a magazine for filling carriers, a receiver to receive filling carriers from the magazine and movable toward and from the lay, a transferrer movable in a transverse path beneath the magazine and coöperating with said receiver, and means for moving said transferrer toward the lay through the forward beat of the lay.

114. A loom having a lay provided with a shuttle box mounted for turning movement, and a picker stick, said box being shaped to permit said turning movement while the picker stick is between the ends of said box.

115. A loom having a lay provided with a shuttle box mounted for turning movement, a picker stick, said box being shaped to permit said turning movement while the picker stick is between the ends of said box, and means below the shuttle box to guide the picker stick.

116. A loom having a lay provided with a shuttle box mounted for turning movement upon its axis, said shuttle box having at one end an arched support to accommodate the head of the picker stick between the ends of the shuttle box, and a guide arm for the picker stick beneath said shuttle box.

117. A weft replenishing loom having a lay provided with a shuttle box mounted for rocking movement, a receiver, a transferrer to position filling carriers from the receiver in said shuttle box when rocked, and means for effecting movement of the transferrer in one direction by the lay, said transferrer having a gravity-impelled movement in the opposite direction.

In testimony whereof, we have signed our names to this specification in the presence of two subscribing witnesses.

EDWARD A. CUNNIFF.
JOHN V. CUNNIFF.
JAMES K. LANNING.

Witnesses:
CHAS. S. RAMSAY,
HORACE A. CROSSMAN.